United States Patent Office 3,538,591
Patented Nov. 10, 1970

3,538,591
SHIVE EXTRACTOR AND METHOD OF EXTRACTING SHIVES
Joseph Howard Reynolds and Arthur Benjamin Levee, Belmore, New South Wales, Australia, assignors to Ceeco Products Pty. Limited, Belmore, New South Wales, Australia, a company of New South Wales
Filed Jan. 30, 1968, Ser. No. 701,616
Claims priority, application Australia, May 4, 1967, 21,297/67
Int. Cl. B23p *19/02, 19/04*
U.S. Cl. 29—427                                        8 Claims

ABSTRACT OF THE DISCLOSURE

This disclosure relates to a shive extractor comprising a support stand, actuating means on the support stand operatively connected to a housing having an extractor assembly mounted therein, said extractor assembly including cam operated extracting tongs, and the method of using the extractor to remove shives from containers.

---

This invention has been devised to provide a shive extractor particularly for extracting resiliently deformable shives such as plastic shives, from containers.

It is known to use in containers, plastic shives which include a comparatively thin walled cylindrical body part and an integral circular flange-like shoulder which engages the inner wall of the container about the bung-hole or the inner end of a bush therein. Such shives are flexible to a degree and this flexibility permits the shoulder part of the shive to contract to enable it to be forced through the bung-hole or the bush and to expand when inside the container, into engagement with the container wall or bush.

The object of the invention is to provide a shive extractor which will automatically extract a used shive from a container and preferably partially sever the extracted shive, to facilitate its removal from the extractor. The extractor prevents all likelihood of a used shive being forced into a container.

The extractor comprises a support stand; actuating means on the support stand operatively connected to a housing having an extractor assembly mounted therein, for moving said housing towards and away from a container located in juxtaposition to the extractor assembly, and for actuating the extractor assembly. The extractor assembly comprises shive extracting tongs having the power end thereof connected to the actuating means and having the work end thereof normally projecting out of the housing. Tong opening and closing means are mounted in the housing in engagement with the tongs. Control means are provided for the actuating means.

One embodiment of the invention will be described with reference to the annexed drawings wherein.

Figure 1:
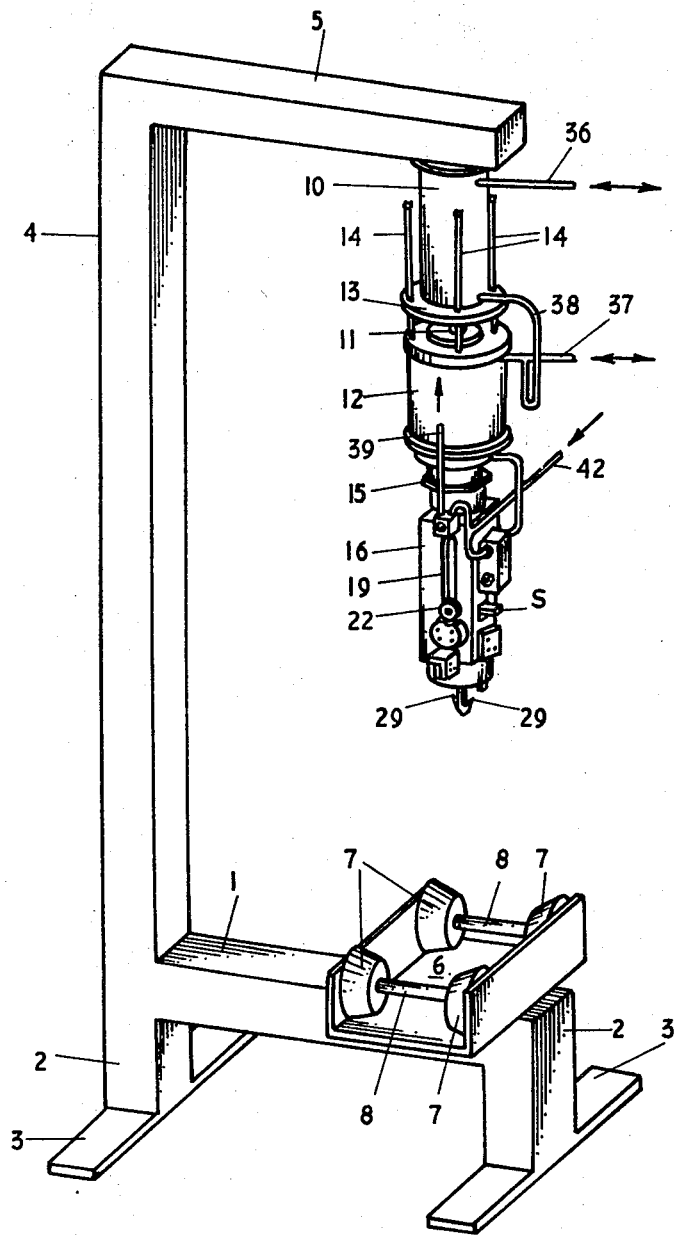
FIG. 1 is a perspective view of the extractor and actuating means therefor, and including a container supporting roller assembly mounted upon the support stand.

The supporting stand consists of a base 1, legs 2 projecting downwardly from the base 1, feet 3 on the legs 2, an upstanding pillar 4 which as illustrated is a continuation of the rear leg 2, and a head member 5 projecting over the base 1. Also, as illustrated, a locating and supporting member consisting of a channel base 6 fixed on the base 1, and rollers 7 mounted on axles 8, in the channel 6, is provided for supporting containers, referred to hereafter as barrels B, from which a shieve 9 is to be extracted.

The head member 5 has one end of a fluid pressure cylinder (driving cylinder) 10 fixed thereto. The plunger 11 of this cylinder projects outwardly thereof and is fixed to one end of a fluid pressure cylinder (extractor cylinder) 12, the cylinders 10, 12 being thus mounted in tandem. The driving cylinder 10 has a ring 13 fixed on the free end thereof and guide rods 14 fixed on the adjacent end of the extractor cylinder 12 project through suitable bearing holes formed in the ring 13 to restrict movement of the extractor cylinder 12 to straight line movement.

Figure 2:
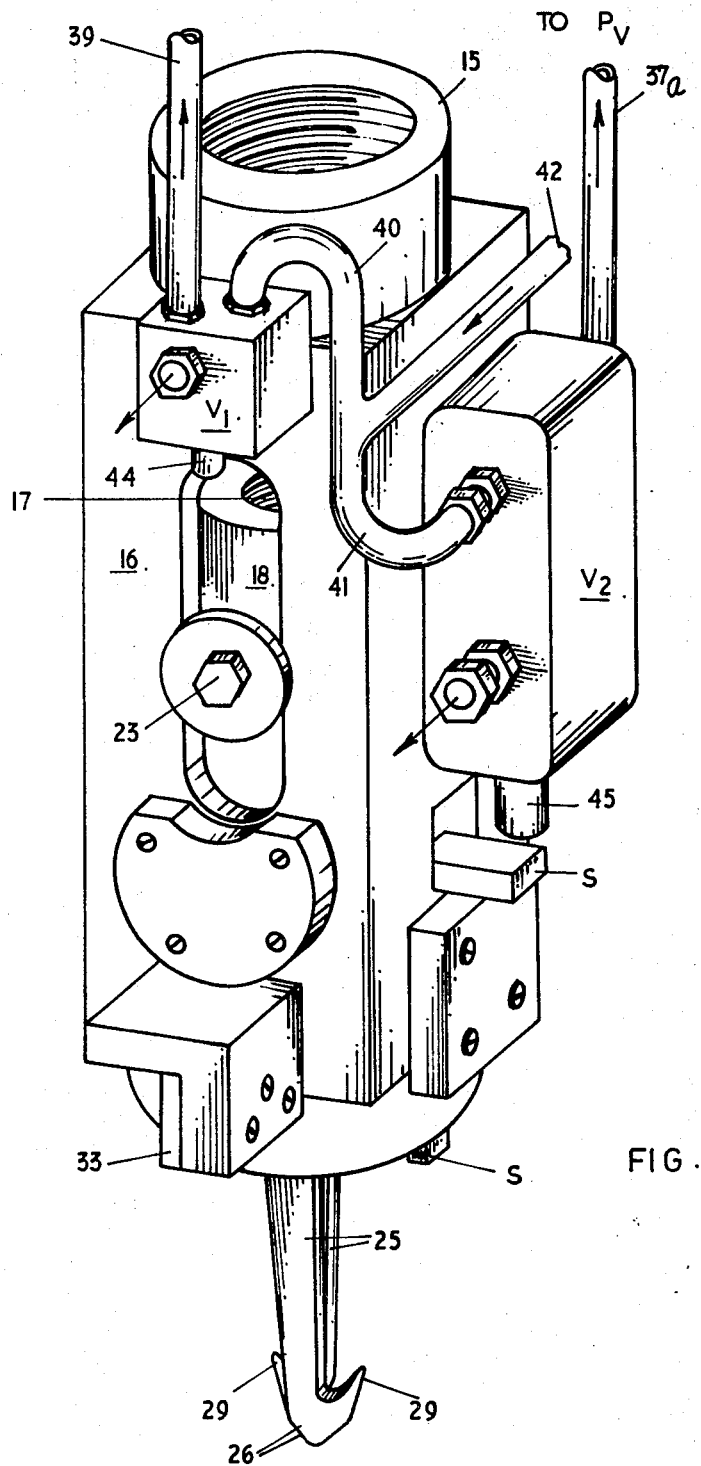
FIG. 2 is a perspective view of the extractor assembly housing showing various components of the extractor assembly and also showing some of the control means for the actuating means.
Figure 3:
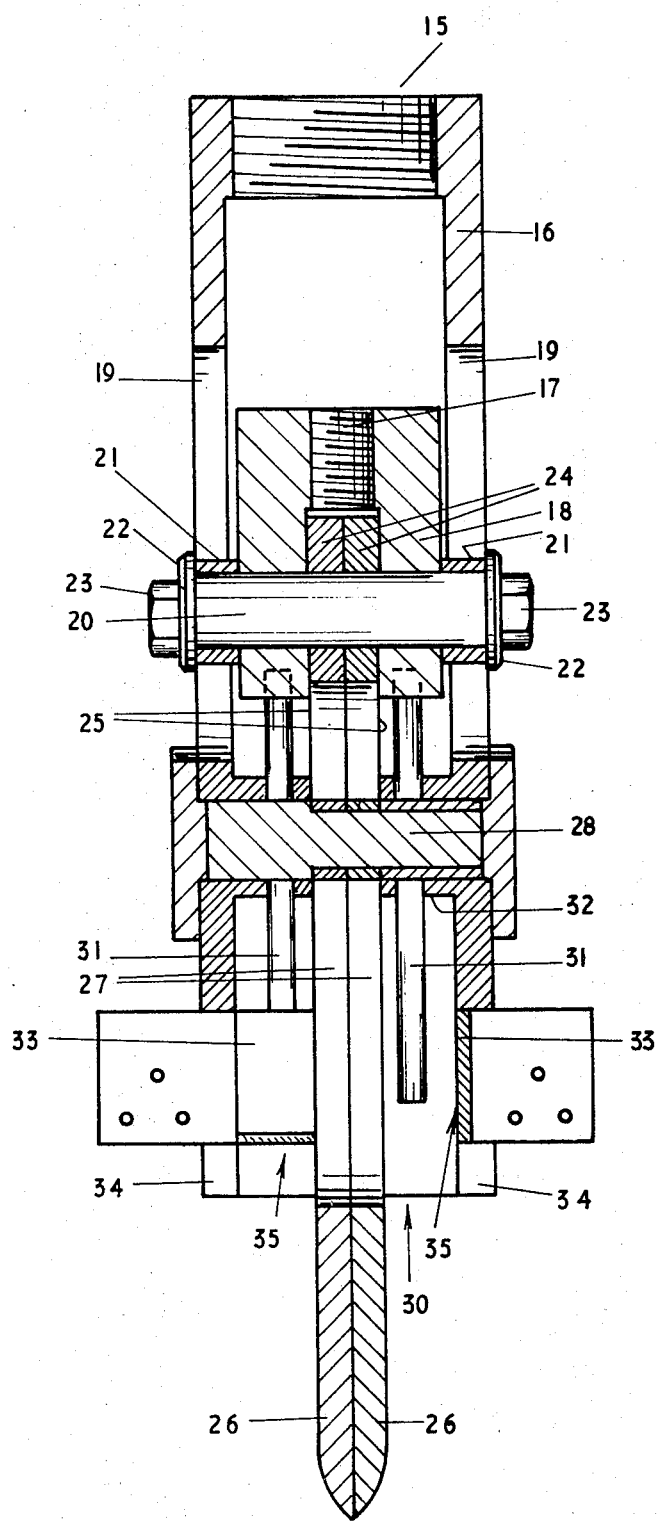
FIG. 3 is a longitudinal central section through the extractor assembly housing and extractor assembly.

The other end of the extractor cylinder 12 is fixed by a suitable bearing coupling 15 to one end of an extractor assembly housing 16, and the plunger (not shown) of the extractor cylinder slidably projects through the coupling 15 and is connected as at 17 to a yoke 18 (FIG. 2), slidable longitudinally in the housing 16.

The housing 16 is slotted longitudinally in opposite side walls thereof to form slide guides 19 for the yoke 18. For this purpose, a journal pin 20 is fixed transversely in the yoke 18 and projects from each side thereof. It has rollers 21 mounted thereon adjacent each end running in the slide guides 19 and retaining means such as washers 22 and nuts 23 hold the rollers 21 on the journal pin 20.

The power end 24 of shive extracting tongs 25 are pivotally mounted on the journal pin 20. The tongs 25 project downwardly through the housing 16 and have their work ends 26 normally closed and projecting out of said housing 16. The tongs each have identically formed, oppositely disposed cam tracks 27 formed longitudinally therein, and a cam pin 28 mounted transversely in the housing 16 engages the walls of the tracks 27 to open and close the tongs 25. The work end 26 of the tongs 27 have hooks 29 formed thereon for gripping and contracting the shive 9 during an extraction cycle of the tongs 25.

The end of the housing 16 having the tongs 25 projecting therefrom is counterbored as at 30 and shive knock out pins 31 fixed to the yoke 18, project through the inner end 32 of the counterbore 30 and into said counterbore 30. Cutting knives 33 are mounted on the housing 16 and project through openings 34 in the housing wall into the counterbore 30. The cutting edges (indicated at 35) of the knives 33 are ahead of the knockout pins 31 and sever a shive 9 before and while the shive 9 is in engagement with the pins 31, to prevent the shive 9 jamming in the counterbore 30.

Figure 8:
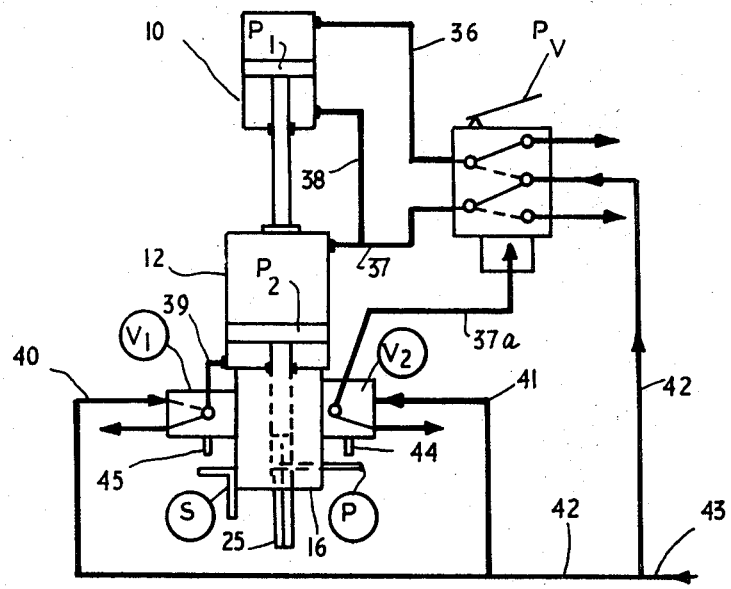
FIG. 8 is a flow diagram showing the control means and a sequence of an extraction cycle.

The various controls for actuating the plungers of cylinders 10–12 are diagrammatically illustrated in FIG. 8, said plungers being referred to hereafter as P1 and P2, respectively.

From a source of pressurised fluid supply (not shown), a pedal valve PV is connected to the upper ends of cylinders 10–12 by pipe lines 36 and 37 and via pipe line 37a to valve V2 mounted on the housing 16. The lower end of cylinder 10 is connected into pipe line 37 by pipe line 38 and the lower end of cylinder 12 is connected by pipe line 39 to valve V1 mounted on the housing 16. The valves V1 and V2 are connected by branch pipes 40–41 into pipe line 42 to the pedal valve PV and by pipe line 43 to the source of supply. The valve V2 has an operating plunger 44 projecting therefrom for engagement by the washer 22 also referenced P in FIG. 8, and the valve V1 has an operating plunger 45 projecting therefrom for engagement by an L shaped slide member S mounted in the housing 16. The slide member S has one end projecting beyond the counterbored end 30 of housing 16 and its other end projecting beneath the plunger 45. It is moved into engagement with plunger 45 when the other end thereof is forced into engagement with a barrel B.

Figure 4:
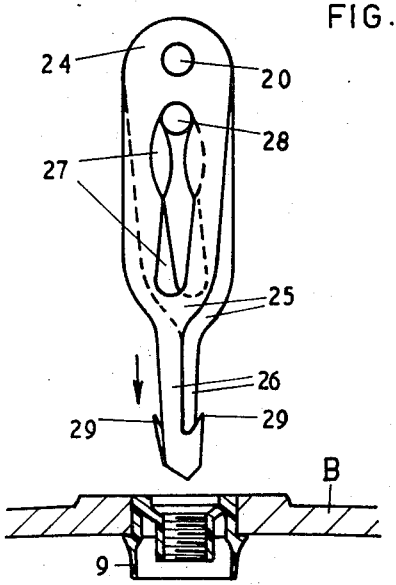
FIGS. 4, 5, 6 and 7 are line drawings illustrating the sequence of operations of the tongs in extracting a shive from a barrel.

With a barrel mounted on the rollers 7, and with the shive therein located in vertical alignment with the tongs, a shive extracting cycle is instituted when the pedal valve PV is depressed:

At a "start" position, plunger P1 is normally raised in cylinder 10 and plunger P2 is normally down in cylinder 12. When pedal valve PV is operated, it exhausts cylinder 10 beneath plunger P1, and cylinder 12 and housing 16 move in the direction of arrow A, FIG. 4, until the work end 26 of tongs 25 pass through the shive 9. At this position, slide S engages barrel B and is raised into engagement with plunger 45 to operate valve V1.

Figure 5:
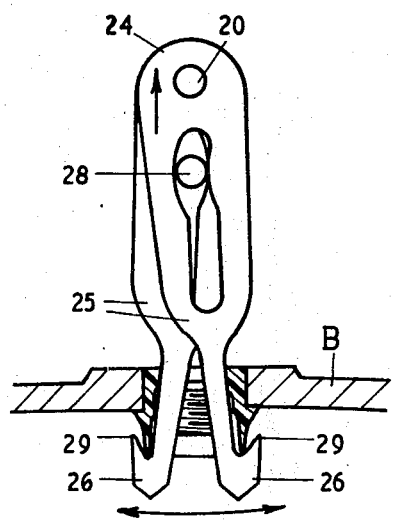
Figure 6:
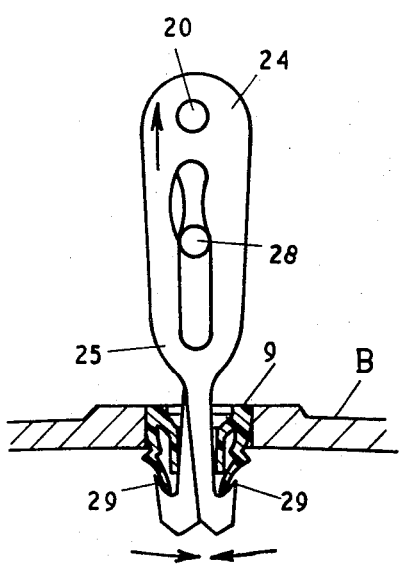
Figure 7:
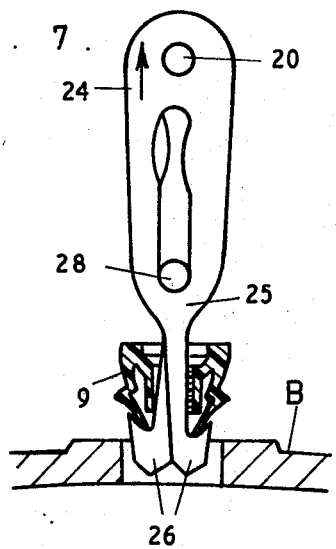

Operation of valve V1 admits pressure fluid behind plunger P2 in cylinder 12 and raises plunger P2, to effect the opening, closing and extraction cycle of the tongs 25 as seen in FIGS. 5–7. Plunger P2 continues to rise until the shive 9 has been severed by the knives 33 and then ejected by the knockout pins 31, and until washer 22–P engages plunger 44 to operate valve V2.

Operation of valve V2 resets the pedal valve PV so that plunger P1 rises and releases slide S, thus allowing plunger P2 to fall and simultaneously washer 22–P releases plunger 44. All controls are then again at the "start" position.

We claim:

1. An extractor for extracting deformable shives from containers, said extractor comprising: a support stand; actuating means on the support stand operatively connected to a housing having an extractor assembly mounted therein, for moving said housing towards and away from a container located in juxtaposition to the extractor assembly and for actuating said extractor assembly; said extractor assembly comprising shive extracting tongs having the power end thereof connected to the actuating means and having the work end thereof normally projecting out of the housing and closed; tong opening and closing means mounted in the housing in engagement with the tongs; control means for the actuating means.

2. An extractor according to claim 1, wherein the actuating means comprises: a pair of fluid pressure cylinders mounted in tandem on the support; one said cylinder (driving cylinder) being fixed at one of its ends to the support and having its plunger rod projecting out of its other end and fixed to one end of the other (extractor) cylinder, said extractor cylinder having its plunger projecting out of the other end thereof into the housing; the tongs being pivotally mounted at the power end thereof on the extractor cylinder plunger; and wherein the control means is arranged to institute an automatic cycle of operations for moving the housing and for extracting the shive from the container.

3. An extractor according to claim 2, wherein the plunger of the extractor cylinder is connected to a yoke slidable in the housing, said yoke having a journal pin mounted transversely therein upon which the power end of the tongs is mounted, said journal pin having a roller on each end thereof in engagement with slide guides formed in opposite walls of the housing.

4. An extractor according to claim 1, wherein the tongs have identically formed, oppositely disposed cam track slots formed longitudinally therein, and a cam pin mounted transversely in the housing projects through the slots and engages the walls thereof, said slots and pin constituting the tong opening and closing means.

5. An extractor according to claim 3, wherein the end of the housing having the tongs projecting therefrom is counterbored to receive a shive extracted from a container and wherein the yoke supports shive knockout pins which project into the counterbore.

6. An extractor according to claim 5, wherein shive severing knives are mounted on the housing and project into the counterbore, said knives being positioned ahead of the knockout pins whereby a shive being drawn into the counterbore is severed throughout its length.

7. An extractor according to claim 1, wherein the support includes a base having container locating means arranged to locate and support a container with its shive in vertical alignment with the tongs.

8. A method of extracting deformable shives from containers, said method comprising: locating the container adjacent an extractor assembly housing with the shive of the container in vertical alignment with shive extracting tongs associated with said housing;

moving the housing whereby the work end of the tongs moves through the shive into the container whilst the work end of the tongs are closed;

moving the tongs to open the work end thereof past the sides of the shive;

moving the tongs to close and grip the shive;

withdrawing the tongs whereby the shive is extracted from the container;

drawing the shive into the housing past cutting knives and into engagement with shive knockout pins whereby the severed shive is ejected from said housing.

References Cited

UNITED STATES PATENTS

| | | | |
|---|---|---|---|
| 1,472,833 | 11/1923 | Herold | 29—427 |
| 2,496,672 | 2/1950 | Newman. | |
| 2,566,847 | 9/1951 | Miller | 29—252 |
| 2,573,567 | 10/1951 | Hancock | 29—252 X |
| 2,706,849 | 4/1955 | Miller | 29—252 |
| 3,069,761 | 12/1962 | Sommer | 29—252 |
| 3,071,848 | 1/1963 | Lawry et al. | 29—267 |
| 3,125,802 | 3/1964 | Kenin et al. | 29—427 |

CHARLIE T. MOON, Primary Examiner

U.S. Cl. X.R.

29—252, 267, 282